United States Patent
Amireddy et al.

(10) Patent No.: US 9,444,892 B1
(45) Date of Patent: Sep. 13, 2016

(54) NETWORK EVENT MANAGEMENT SUPPORT FOR VEHICLE WIRELESS COMMUNICATION

(71) Applicant: Sprint Communications Company L.P., Overland Park, KS (US)

(72) Inventors: Sridhar Reddy Amireddy, Overland Park, KS (US); David A. Haugh, Olathe, KS (US); Alex J. Oyler, Kansas City, MO (US); Joshua D. Turner, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/703,997

(22) Filed: May 5, 2015

(51) Int. Cl.
*H04W 4/12* (2009.01)
*H04L 29/08* (2006.01)
*H04M 3/42* (2006.01)
*H04W 8/02* (2009.01)
*H04W 76/02* (2009.01)

(52) U.S. Cl.
CPC .............. *H04L 67/12* (2013.01); *H04L 67/32* (2013.01); *H04M 3/42348* (2013.01); *H04W 4/12* (2013.01); *H04W 8/02* (2013.01); *H04W 76/02* (2013.01)

(58) Field of Classification Search
None
See application file for complete search history.

(56) References Cited

U.S. PATENT DOCUMENTS

| | | |
|---|---|---|
| 5,892,900 A | 4/1999 | Ginter et al. |
| 6,622,083 B1 | 9/2003 | Knockeart et al. |
| 7,209,964 B2 | 4/2007 | Dugan et al. |
| 7,366,892 B2 | 4/2008 | Spaur et al. |
| 7,376,392 B2 | 5/2008 | Myojo |
| 7,454,473 B2 | 11/2008 | Suzuki |
| 7,912,224 B2 | 3/2011 | Lee et al. |
| 7,949,375 B2 | 5/2011 | Kortge |

(Continued)

FOREIGN PATENT DOCUMENTS

| | | |
|---|---|---|
| DE | 102011112540 A1 | 4/2012 |
| JP | 20062441 A | 9/2006 |

(Continued)

OTHER PUBLICATIONS

Bloomcamp, Eric Michael, et al., Patent Application entitled "Dual Path in-Vehicle Communication," filed Feb. 15, 2013, U.S. Appl. No. 13/769,268.

(Continued)

*Primary Examiner* — Diane Mizrahi

(57) ABSTRACT

A method of communicating with a telematics unit in a vehicle. The method comprises receiving a content message directed to a telematics unit by an event manager application executing on a server computer, wherein the telematics unit is an electronic device comprising a wireless communication transceiver and integrated into a motor vehicle, determining by the event manager application that the content message is a high priority message type, and determining by the event manager application that the telematics unit is off-line and out-of-wireless-coverage. The method further comprises, responsive to determining that the content message is a high priority message type and to determining that the telematics unit is off-line and out-of-wireless-coverage, sending by the event manager application a wake-up message to the telematics unit, wherein the telematics unit, responsive to receiving the wake-up message, establishes a roaming data wireless communication link and receives the content message via the data link.

20 Claims, 6 Drawing Sheets

(56) References Cited

U.S. PATENT DOCUMENTS

| | | | |
|---|---|---|---|
| 7,966,111 | B2 | 6/2011 | Moinzadeh et al. |
| 8,271,050 | B2 | 9/2012 | Weiss |
| 8,417,823 | B2* | 4/2013 | Luna .................. H04W 28/14 709/213 |
| 8,457,686 | B2 | 6/2013 | Przybylski |
| 8,484,707 | B1 | 7/2013 | Bertz et al. |
| 8,527,164 | B2 | 9/2013 | Staudinger et al. |
| 8,548,532 | B1 | 10/2013 | Ng |
| 8,606,335 | B2 | 12/2013 | Ozaki |
| 8,626,152 | B2 | 1/2014 | Farrell et al. |
| 8,630,747 | B2 | 1/2014 | Burcham et al. |
| 8,676,199 | B2 | 3/2014 | Madhavan et al. |
| 8,750,942 | B1 | 6/2014 | Ng |
| 8,787,949 | B2 | 7/2014 | Sumcad et al. |
| 8,994,591 | B2* | 3/2015 | Dupray ................ G01C 21/206 342/457 |
| 9,002,574 | B2 | 4/2015 | Garrett et al. |
| 9,031,498 | B1 | 5/2015 | Bertz et al. |
| 9,032,547 | B1 | 5/2015 | Hohler et al. |
| 9,110,774 | B1 | 8/2015 | Bonn et al. |
| 9,173,238 | B1 | 10/2015 | Bloomcamp et al. |
| 9,252,951 | B1 | 2/2016 | Katzer |
| 9,398,454 | B1 | 7/2016 | Burcham et al. |
| 2003/0096641 | A1 | 5/2003 | Odinak |
| 2003/0120601 | A1 | 6/2003 | Ouye et al. |
| 2003/0224840 | A1 | 12/2003 | Frank et al. |
| 2004/0044585 | A1 | 3/2004 | Franco |
| 2004/0083041 | A1 | 4/2004 | Skeen et al. |
| 2004/0125957 | A1 | 7/2004 | Rauber et al. |
| 2004/0157650 | A1 | 8/2004 | Wissinger et al. |
| 2005/0021744 | A1 | 1/2005 | Haitsuka et al. |
| 2005/0065779 | A1 | 3/2005 | Odinak |
| 2005/0113102 | A1 | 5/2005 | Kwon et al. |
| 2006/0059480 | A1 | 3/2006 | Kimoto |
| 2006/0143463 | A1 | 6/2006 | Ikeda et al. |
| 2006/0154659 | A1 | 7/2006 | Roter et al. |
| 2006/0168578 | A1 | 7/2006 | Vorlicek |
| 2007/0028220 | A1 | 2/2007 | Miller et al. |
| 2007/0086579 | A1 | 4/2007 | Lorello et al. |
| 2007/0113269 | A1 | 5/2007 | Zhang |
| 2007/0124043 | A1 | 5/2007 | Ayoub et al. |
| 2007/0124045 | A1 | 5/2007 | Ayoub et al. |
| 2007/0124046 | A1 | 5/2007 | Ayoub et al. |
| 2007/0160199 | A1 | 7/2007 | Sekiguchi et al. |
| 2007/0288423 | A1 | 12/2007 | Kimoto |
| 2008/0034126 | A1 | 2/2008 | Baker |
| 2008/0072047 | A1 | 3/2008 | Sarikaya et al. |
| 2008/0148374 | A1 | 6/2008 | Spaur et al. |
| 2008/0162676 | A1 | 7/2008 | Magnusson |
| 2008/0289018 | A1 | 11/2008 | Kawaguchi |
| 2008/0289044 | A1 | 11/2008 | Choi |
| 2008/0307086 | A1 | 12/2008 | Brooks et al. |
| 2009/0028082 | A1 | 1/2009 | Wynn et al. |
| 2009/0049119 | A1 | 2/2009 | Marcinkiewicz et al. |
| 2009/0109941 | A1 | 4/2009 | Carter |
| 2009/0217036 | A1 | 8/2009 | Irwin et al. |
| 2009/0287499 | A1 | 11/2009 | Link |
| 2010/0097239 | A1 | 4/2010 | Campbell et al. |
| 2010/0136944 | A1 | 6/2010 | Taylor et al. |
| 2010/0197362 | A1 | 8/2010 | Saitoh et al. |
| 2010/0220250 | A1 | 9/2010 | Vanderwall et al. |
| 2010/0234071 | A1 | 9/2010 | Shabtay et al. |
| 2010/0235285 | A1 | 9/2010 | Hoffberg |
| 2010/0245122 | A1 | 9/2010 | Haralson et al. |
| 2010/0260350 | A1 | 10/2010 | Chutorash et al. |
| 2010/0285787 | A1 | 11/2010 | Matsuda |
| 2011/0009107 | A1 | 1/2011 | Guba et al. |
| 2011/0086668 | A1 | 4/2011 | Patel |
| 2011/0090908 | A1 | 4/2011 | Jacobson et al. |
| 2011/0099316 | A1 | 4/2011 | Tseng et al. |
| 2011/0111728 | A1 | 5/2011 | Ferguson et al. |
| 2011/0252415 | A1 | 10/2011 | Ricci |
| 2011/0257973 | A1 | 10/2011 | Chutorash et al. |
| 2011/0263293 | A1 | 10/2011 | Blake et al. |
| 2011/0295444 | A1 | 12/2011 | Westra et al. |
| 2011/0310731 | A1 | 12/2011 | Park et al. |
| 2012/0028597 | A1 | 2/2012 | Chmielewski et al. |
| 2012/0028607 | A1 | 2/2012 | Tengler et al. |
| 2012/0028656 | A1 | 2/2012 | Yi et al. |
| 2012/0109406 | A1 | 5/2012 | Yousefi et al. |
| 2012/0127139 | A1 | 5/2012 | Hayami et al. |
| 2012/0134497 | A1 | 5/2012 | Roitshtein et al. |
| 2012/0142367 | A1 | 6/2012 | Przybylski |
| 2012/0159638 | A1 | 6/2012 | Mcdade, Sr. |
| 2012/0167071 | A1 | 6/2012 | Paek |
| 2012/0183221 | A1 | 7/2012 | Alasry et al. |
| 2012/0203557 | A1 | 8/2012 | Odinak |
| 2012/0282895 | A1 | 11/2012 | Bai et al. |
| 2012/0324046 | A1 | 12/2012 | Park |
| 2013/0082820 | A1 | 4/2013 | Tieman |
| 2013/0205026 | A1 | 8/2013 | Ricci |
| 2013/0218400 | A1 | 8/2013 | Knoop et al. |
| 2013/0226391 | A1 | 8/2013 | Nordbruch et al. |
| 2013/0297456 | A1 | 11/2013 | Annan et al. |
| 2013/0304281 | A1 | 11/2013 | Burcham et al. |
| 2014/0053261 | A1 | 2/2014 | Gupta et al. |
| 2014/0068010 | A1 | 3/2014 | Nicholson et al. |
| 2014/0087760 | A1 | 3/2014 | Bennett |
| 2014/0128047 | A1 | 5/2014 | Edwards et al. |
| 2014/0130036 | A1 | 5/2014 | Gurikar et al. |
| 2014/0143354 | A1 | 5/2014 | Tiernan |
| 2014/0222298 | A1 | 8/2014 | Gurin |
| 2014/0222910 | A1* | 8/2014 | Petersen ................ G06Q 30/02 709/204 |
| 2014/0336919 | A1* | 11/2014 | Li ........................ G01C 21/3655 701/400 |

FOREIGN PATENT DOCUMENTS

| | | |
|---|---|---|
| WO | WO2013166418 A2 | 11/2013 |
| WO | WO2013173331 A1 | 11/2013 |

OTHER PUBLICATIONS

Bloomcamp, Eric M., et al., Patent Application entitled "Authenticating Mobile Device for on Board Diagnostic System Access," filed Sep. 23, 2013, U.S. Appl. No. 14/034,475.

Finnerty, Brian J., et al., Patent Application entitled "Method for Authenticating Driver for Registration of in-Vehicle Telematics Unit," filed Oct. 31, 2014, U.S. Appl. No. 14/530,667.

Amireddy, Sridhar Reddy, et al., Patent Application entitled, "Vehicle Remote Operations Control," filed Apr. 28, 2015, U.S. Appl. No. 14/698,522.

Amireddy, Sridhar Reddy, et al., Patent Application entitled, "Vehicle Telematics Unit Communication Authorization and Authentication and Communication Service Provisioning," filed Aug. 8, 2015, U.S. Appl. No. 14/819,425.

Aboda, B., et al., "Exentsible Authentication Protocol (EAP)", Network Working Group, RFC 3748, Standards Track, Jun. 2004.

Foreign Communication From a Related Counterpart Application, International Search Report and Written Opinion dated Jun. 13, 2013, PCT/US13/40940 filed on May 14, 2013.

Foreign Communication From a Related Counterpart Application, International Preliminary Report on Patentability dated Nov. 27, 2014, PCT/US13/40940 filed on May 14, 2013.

Foreign Communication From a Related Counterpart Application, International Search Report and Written Opinion dated Dec. 23, 2013, PCT/US13/39514 filed on May 3, 2013.

Foreign Communication From a Related Counterpart Application, International Preliminary Report on Patentability dated Nov. 13, 2014, PCT/US13/39514 filed on May 3, 2013.

Belkin, Wireless Network Access Point User Manual, published by Belkin Corporation, 2003, pp. 1-36.

First Action Interview Pre-Communication dated Aug. 21, 2012, U.S. Appl. No. 13/218,503, filed Aug. 26, 2011.

First Action Interview Office Action dated Jan. 3, 2013, U.S. Appl. No. 13/218,503, filed Aug. 26, 2011.

Final Office Action dated May 7, 2013, U.S. Appl. No. 13/218,503, filed Aug. 26, 2011.

(56) References Cited

OTHER PUBLICATIONS

Advisory Action dated Aug. 1, 2013, U.S. Appl. No. 13/218,503, filed Aug. 26, 2011.
Office Action dated Feb. 5, 2014, U.S. Appl. No. 13/218,503, filed Aug. 26, 2011.
Final Office Action dated Jun. 16, 2014, U.S. Appl. No. 13/218,503, filed Aug. 26, 2011.
Advisory Action dated Sep. 26, 2014, U.S. Appl. No. 13/218,503, filed Aug. 26, 2011.
Office Action dated Jan. 13, 2016, U.S. Appl. No. 13/218,503, filed Aug. 26, 2011.
Restriction Requirement dated May 7, 2014, U.S. Appl. No. 13/094,494, filed Apr. 26, 2011.
Office Action dated Aug. 28, 2014, U.S. Appl. No. 13/094,494, filed Apr. 26, 2011.
Notice of Allowance dated Dec. 3, 2014, U.S. Appl. No. 13/094,494, filed Apr. 26, 2011.
First Action Interview Pre-Interview Communication dated Oct. 26, 2012, U.S. Appl. No. 13/156,438, filed Jun. 9, 2011.
Notice of Allowance dated Feb. 26, 2013, U.S. Appl. No. 13/156,438, filed Jun. 9, 2011.
First Action Interview Pre-Communication dated Jan. 31, 2012, U.S. Appl. No. 13/246,554, filed Sep. 27, 2011.
FAIPP Office Action dated May 21, 2012, U.S. Appl. No. 13/246,554, filed Sep. 27, 2011.
Final Office Action dated Sep. 5, 2012, U.S. Appl. No. 13/246,554, filed Sep. 27, 2011.
Advisory Action dated Nov. 2, 2012, U.S. Appl. No. 13/246,554, filed Sep. 27, 2011.
Office Action dated Dec. 5, 2012, U.S. Appl. No. 13/246,554, filed Sep. 27, 2011.
Notice of Allowance dated May 20, 2013, U.S. Appl. No. 13/246,554, filed Sep. 27, 2011.
First Action Interview Pre-Communication dated Nov. 15, 2013, U.S. Appl. No. 13/791,658, filed Aug. 20, 2013.
Notice of Allowance dated Jan. 30, 2014, U.S. Appl. No. 13/791,658, filed Aug. 20, 2013.
Restriction Requirement dated Mar. 19, 2015, U.S. Appl. No. 13/463,799, filed May 3, 2012.
Office Action dated Sep. 9, 2015, U.S. Appl. No. 13/463,799, filed May 3, 2012.
Final Office Action dated Mar. 10, 2016, U.S. Appl. No. 13/463,799, filed May 3, 2012.
Restriction Requirement dated Sep. 4, 2015, U.S. Appl. No. 13/455,121, filed Apr. 24, 2012.
First Action Interview Pre-Communication dated Jan. 29, 2016, U.S. Appl. No. 13/455,121, filed Apr. 24, 2012.
Notice of Allowance dated Mar. 11, 2016, U.S. Appl. No. 13/455,121, filed Apr. 24, 2012.
Office Action dated Mar. 13, 2013, U.S. Appl. No. 13/471,107, filed May 14, 2012.
Notice of Allowance dated Aug. 26, 2013, U.S. Appl. No. 13/471,107, filed May 14, 2012.
Office Action dated Aug. 12, 2014, U.S. Appl. No. 13/769,268, filed Feb. 15, 2013.
Final Office Action dated Mar. 17, 2015, U.S. Appl. No. 13/769,268, filed Feb. 15, 2013.
Notice of Allowance dated Jun. 12, 2015, U.S. Appl. No. 13/769,268, filed Feb. 15, 2013.
First Action Interview Pre-Communication dated Dec. 1, 2014, U.S. Appl. No. 13/844,226, filed Mar. 15, 2013.
Notice of Allowance dated Mar. 12, 2015, U.S. Appl. No. 13/844,226, filed Mar. 15, 2013.
Office Action dated Jul. 14, 2014, U.S. Appl. No. 13/661,536, filed Oct. 26, 2012.
Notice of Allowance dated Jan. 6, 2015, U.S. Appl. No. 13/661,536, filed Oct. 26, 2012.
Supplemental Notice of Allowance dated Jan. 30, 2015, U.S. Appl. No. 13/661,536, filed Oct. 26, 2012.
First Action Interview Pre-Communication dated Jul. 9, 2015, U.S. Appl. No. 14/034,475, filed Sep. 23, 2013.
Final Office Action dated Mar. 8, 2016, U.S. Appl. No. 14/034,475, filed Sep. 23, 2013.
Restriction Requirement dated Feb. 24, 2015, U.S. Appl. No. 14/304,861, filed Jun. 13, 2014.
Office Action dated Jun. 30, 2015, U.S. Appl. No. 14/304,861, filed Jun. 13, 2014.
Notice of Allowance dated Sep. 18, 2015, U.S. Appl. No. 14/304,861, filed Jun. 13, 2014.
Shipley, Trevor D., et al., Patent Application entitled "Mobile Communication System Identity Pairing," filed Aug. 26, 2011, U.S. Appl. No. 13/218,503.
Burcham, Robert H., et al., Patent Application entitled "In-car Head unit Wireless Communication Service Subscription Initialization," filed Apr. 24, 2012, U.S. Appl. No. 13/455,121.
Notice of Allowance dated Apr. 28, 2016, U.S. Appl. No. 13/218,503, filed Aug. 26, 2011.
Advisory Action dated May 20, 2016, U.S. Appl. No. 13/463,799, filed May 3, 2012.
Advisory Action dated Jun. 1, 2016, U.S. Appl. No. 14/034,475, filed Sep. 23, 2013.
First Action Interview Pre-Communication dated Apr. 25, 2016, U.S. Appl. No. 14/530,667, filed Oct. 31, 2014.

\* cited by examiner

NETWORK EVENT MANAGEMENT SUPPORT FOR VEHICLE WIRELESS COMMUNICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Motor vehicles may be provided with a telematics unit or a head unit that is communicatively coupled to a controller area network (CAN) bus of the vehicle and that communicates through the CAN bus with a variety of electromechanical devices, electronic controllers, and sensors. The telematics unit is a computer system and may provide some vehicle control functionality as well as monitoring of vehicle operating metrics and outside environment metrics. For example, the telematics unit may be a relay for remote operations commands such as door lock and unlock, engine start and engine stop, horns and lights flash, and the like. The telematics unit, in some cases, may provide image processing for rear back-up imaging, for example creating a mirror image of visual data received from back-up cameras. The telematics unit may likewise provide other computing and/or processing functionality such as navigation system functionality and entertainment system functionality.

The telematics unit may comprise a cellular wireless radio transceiver operable for communication via a cellular wireless communication service, for example when a subscription account for cellular wireless communication has been provisioned for the telematics unit by a wireless communication service provider. Remote operation commands may be received by the radio transceiver of the telematics unit, for example from a cell tower. The commands may be originated by an application executing on a mobile phone, for example a mobile phone belonging to an owner of the vehicle. The wireless communication capability of the telematics unit may be used to access diagnostic information from the vehicle or fleet information from a motor pool vehicle or a rental vehicle.

SUMMARY

In an embodiment, a method of communicating with telematics units in vehicles by a communication hub in a wireless communication service provider network that maintains communication state information about a plurality of telematics units, wherein the telematics unit communication states comprise an on-line state, an off-line state, and an off-line and out-of-wireless coverage state, is disclosed. The method comprises receiving a content message directed to a telematics unit by an event manager application executing on a server computer, wherein the telematics unit is an electronic device comprising a wireless communication transceiver and integrated into a motor vehicle and determining by the event manager application that the content message is a high priority message type. The method further comprises determining by the event manager application that the telematics unit is off-line and out-of-wireless-coverage and, responsive to determining that the content message is a high priority message type and to determining that the telematics unit is off-line and out-of-wireless-coverage, sending by the event manager application a wake-up message to the telematics unit. The telematics unit, responsive to receiving the wake-up message, establishes a roaming data wireless communication link and receives the content message via the roaming data wireless communication link.

In an embodiment, another method of communicating with a telematics unit in a vehicle is disclosed. The method comprises receiving a content message directed to a telematics unit by an event manager application executing on a server computer, wherein the telematics unit is an electronic device comprising a wireless communication transceiver and integrated into a motor vehicle, determining by the event manager application that the content message is a low priority message type, and determining by the event manager application that the telematics unit is off-line. The method further comprises, responsive to determining that the content message is a low priority message type and to determining that the telematics unit is off-line, storing by the event manager application the content message in a message queue, after storing the content message in the message queue, receiving by the event manager application a status message that indicates that the telematics unit is on-line, and, responsive to receiving the status message indicating the telematics unit is on-line, transmitting by the event manager application the content message to the telematics unit.

In an embodiment, yet another method of communicating with a telematics unit in a vehicle is disclosed. The method comprises receiving a content message directed to a telematics unit by an event manager application executing on a server computer, wherein the telematics unit is an electronic device comprising a wireless communication transceiver and integrated into a motor vehicle, determining by the event manager application that an acknowledgement timer associated with the content message is expired, and responsive to determining that the acknowledge timer is expired, sending by the event manager application a wake-up message to the telematics unit. The telematics unit, responsive to receiving the wake-up message, establishes a wireless data communication link and receives the content message.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
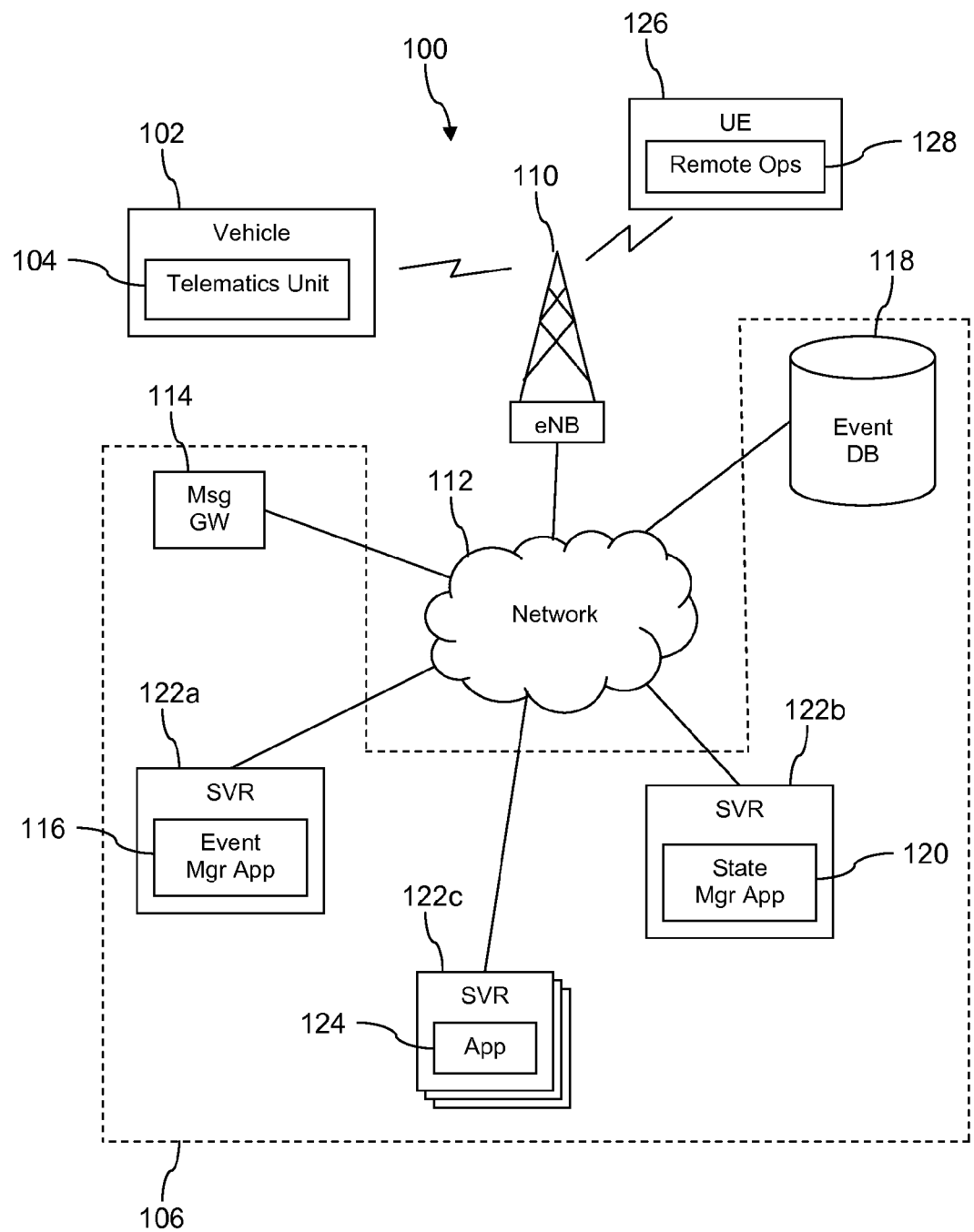
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a communication system that improves handling message exchanges between a central communication hub and a large number of telematics units installed in vehicles. Specifically an event management application coordinates message communication to and from telematics units in vehicles based on a communication state of each of the telematics units stored by the communication hub. Formerly, because the communication state of the telematics units was not known at the hub, every message was transmitted in an active handling mode of the event manager application which entailed an extra level of processing burden for the event manager application. According to the present teaching, when the telematics unit associated with a message to be transmitted to the subject telematics unit is determined to have an on-line communication state, the event management application can allow the message transmission to occur in a passive handling mode that entails no active involvement of the event manager application: for example, the message is enqueued in a messaging gateway, the subject telematics unit is notified of the pending message by a lightweight communication protocol, and the telematics unit retrieves the pending message according to a publish-subscribe mechanism.

When the subject telematics unit is determined to have an off-line communication state, the event manager application may process the message in an active handling mode that comprises sending a wake-up message to the subject telematics unit, for example sending a short message service (SMS) message to the subject telematics unit. When the telematics unit receives the wake-up message, it establishes a wireless data communication link to a cell tower and a data communication session with the messaging gateway. When the data communication session is established with the messaging gateway, the telematics unit is notified of a pending message, and the telematics unit retrieves the pending message from the messaging gateway according to a publish-subscribe mechanism. Alternatively, in this situation (i.e., when the subject telematics unit has an off-line communication state) the event manager application may itself transmit the message to the telematics unit.

When the telematics unit establishes a data communication session with the messaging gateway and/or the communication hub, the telematics unit sends a message indicating its on-line communication state, and this communication state is stored in the hub. When the telematics unit is preparing to terminate the data communication session—for example, when an engine of the vehicle in which the telematics unit is installed has been turned off, the vehicle has been vacated (seat sensors indicate no weight on seats), and doors have been locked—the telematics unit sends a message indicating its off-line communication state, and this communication state is stored in the hub indexed to the subject telematics unit. While the telematics unit is in the on-line communication state it periodically sends a message that confirms that the telematics unit is still on-line. In some contexts this may be referred to as a heartbeat message. If the heartbeat message of the telematics unit is not received within an expected period of time, the hub may deem the communication state of the telematics unit to be off-line and may further characterize the state as a graceless off-line state or an off-line exception state. In some contexts this may be referred to as an off-line and out-of-coverage state.

In an embodiment, the communication state of telematics units may be maintained by a state manager application in the communication hub. The state manager application may determine the off-line exception state based on the lack of the heartbeat message in combination with a determination that the last known location of the telematics unit was an area of marginal coverage, for example at an edge of a coverage zone of a wireless communication service provider. The telematics unit may have lost communication connectivity because the vehicle in which the telematics unit is installed has driven out of the coverage area of the wireless communication service provider that provides wireless communication service to the telematics unit. Alternatively, the heartbeat may be lost while the telematics unit remains in a wireless coverage area of the primary service provider, but where the primary service provider does not provide data wireless coverage or where its data wireless coverage is meagre.

In an embodiment, the messages that are directed to the telematics units may be associated with a priority, for example one of a high priority or a low priority. If a telematics unit has an off-line communication state and a low priority message addressed to the subject telematics unit is introduced into the communication hub (for example, from an advertiser sending restaurant promotions to the telematics unit), the message may simply be enqueued by the messaging gateway, and the event manager application may not send a wake-up message to the telematics unit. On the other hand, if a high priority message addressed to the subject telematics unit is introduced into the communication hub (for example, from a mobile phone of an owner of the vehicle sending a remote vehicle unlock command or a remote vehicle lights and horn activate command), the event manager application sends a wake-up message to the telematics unit, the telematics unit establishes a data communication session, and receives and processes the high priority message. In an embodiment, the event manager application further sends the high priority message to the telematics unit, but in an alternative embodiment, the message is simply enqueued by the messaging gateway and a notification of a pending message is sent by the messaging gateway to the telematics unit.

When the communication state of the telematics unit is off-line exception, the telematics unit may be out of wireless coverage of the primary wireless communication service provider (e.g., not in a home wireless network coverage area) but may be able to receive roaming wireless coverage from a different service provider. If the message priority is low, it may be undesirable for the telematics unit to establish a roaming data communication session, which may entail additional billing costs to an owner of the vehicle in which the telematics unit is installed. When the message priority is high, however, it may be desirable to establish the roaming data communication session notwithstanding additional roaming charges. The event manager application may evaluate these different situations and selectively send or not send a wake-up message to the telematics unit. The priority classifications of messages may take this into consideration. For example, there may be a low priority classification, a medium priority classification, and a high priority classification. If the telematics unit is in an off-line communication state, the event manager application may send a wake-up message when either a medium priority or a high priority message is pending. When the telematics unit is in an off-line exception communication state, the event manager application may send a wake-up message only when a high priority message is pending (e.g., not cause data roaming charges to be incurred for either low priority messages or medium priority messages).

Turning now to FIG. 1, a system 100 is described. In an embodiment, the system 100 comprises a vehicle 102 comprising a telematics unit 104. The telematics unit 104 communicates with a communication hub 106 via a wireless communication link provided by an enhanced node B (eNB) 110 and via a communication network 112. The communication network 112 comprises one or more public communication networks, one or more private communication networks, or a combination thereof. The eNB 110 may be referred to by other names in some contexts, such as a cell tower or a base transceiver station (BTS). The eNB 110 may establish wireless communication links to the telematics unit 104 according to one or more of a long-term evolution (LTE), a code division multiple access (CDMA), a global system for mobile communication (GSM), or a worldwide interoperability for microwave access (WiMAX) wireless communication protocol. While a single vehicle 102, a single telematics unit 104, and a single eNB 110 are illustrated in FIG. 1, it is understood that the system 100 may comprise a large number of each of these. For example, in an embodiment, the system 100 may promote communication of the communication hub 106 with hundreds of thousands or millions of telematics units 104 using tens of thousands of eNBs 110.

The communication hub 106 provides messaging support for the telematics unit 104, for example promoting messages being sent from a user equipment (UE) 126 to the telematics unit 104 or messages sent from the telematics unit 104 to the UE 126. In some contexts the messages that contain message content may be referred to as content messages to distinguish them from a wake-up message. The communication hub 106 may, for example, be operated by a wireless communication service provider to provide communication services to vehicles 102 and/or telematics units 104. The UE 126 may be provided with a wireless communication link from the same eNB 110 that provides a wireless communication link to the telematics unit 104, as illustrated in FIG. 1, or the UE 126 may be provided a wireless communication link by a different eNB 110. The UE 126 may be a mobile phone, a smart phone, a laptop computer, a notebook computer, a tablet computer, a media player, a wearable computer, a headset computer, or some other mobile communication device. The communication hub 106 provides messaging support for communication between the telematics unit 104 and a server (not shown) or other computer (not shown) that may be communicatively coupled to the network 112 by a wired connection.

It is contemplated that the communication hub 106 may promote a wide variety of communication services for the telematics unit 104. In an embodiment, the communication hub 106 supports one or more of remote operation commands messaging, diagnostic data feeds messaging, maintenance commands messaging, parental controls messaging, stolen vehicle locator messaging, and/or fleet vehicle status messaging. The communication hub 106 may be considered a platform or framework for extending messaging capability of the telematics unit 104, in that new message forms or categories may be encapsulated in events and/or message formats provided by the communication hub 106 without major redesign or rework of the communication hub 106. The telematics unit 104 may be updated to add any desirable message handling capabilities associated specifically with the new message form.

The communication hub 106 may support remote operation commands (ROC) such as a door lock command, a door unlock command, an engine start command, an engine stop command, a lights and horn command, an interior environment control command, and the like. ROCS may be sent from the UE 126 from a remote operations application 128 via a wireless link to the eNB 110, to the network 112, and to the communication hub 106. The communication hub 106 may send the ROCS to the vehicle 102 and the telematics unit 104. ROCS may also be sent to the vehicle 102 and the telematics unit 104 by other devices such as servers or computers coupled to the network 112 (e.g., a laptop computer of an owner of the vehicle 102 while sitting in his or her living room on a cold morning, a computer in a service and repair department of an automobile dealership). ROCS may comprise authorization tokens such as personal identification numbers (PINs) or passwords to thwart unauthorized and/or malicious invocation of ROCS.

The communication hub 106 may support fleet vehicle status updates. Rental car businesses may own a large numbers of vehicles 102 that may have the telematics unit 104 installed. The telematics unit 104 may be configured to periodically report status of the vehicle via the communication hub 106 to a data store or to a server computer. For example, all telematics units 104 installed in vehicles 102 owned by a company may report in once per day, once per week, or on some other periodic interval. The status information may comprise one or more of an odometer reading (mileage), a maximum speed attained during the subject reporting period, a remaining life of oil in the vehicle, a location of the vehicle, an account of premium services delivered by the vehicle 102 during the subject reporting period, a summary of operational errors or faults experienced by the vehicle 102 during the subject reporting period, and the like. If the telematics unit 104 fails to transmit a fleet vehicle status message during the appropriate time interval, the rental company may initiate efforts to locate and/or recover the vehicle 102 and/or to contact the current renter of the vehicle 102.

The communication hub 106 may support diagnostic data feeds. Diagnostic data feeds may be initiated by a query message sent from a computer to the telematics unit 104 via the communication hub 106, for example from a workstation of a maintenance technician in a service and repair department of a car dealership having access to a suitable password. The query message may identify specific diagnostic information desired or a general high level diagnostic report. The telematics unit 104 may canvas a variety of systems within the vehicle 102 for state information and/or error log information. The telematics unit 104 may transmit diagnostics information via the eNB 110 to the network 112, to the communication hub 106. The communication hub 106 may transmit the diagnostics information via the network 112 to the workstation or to the computer that sent the diagnostic query message. The diagnostic information received by the workstation or computer may be employed to troubleshoot and repair the vehicle 102. The communication hub 106 may further support maintenance commands messaging, for example sending parameter updates from a workstation in a service and repair department via the communication hub 106 to the telematics unit 104. The telematics unit 104 may process received maintenance command messages by updating electronic systems in the vehicle 102, for example adjusting one or more engine control parameters to better adopt engine performance for high altitude operation when an owner of the vehicle has relocated her residence from a low elevation in Texas (600 feet) to a high elevation in Colorado (7,000 feet).

The communication hub 106 may support parental controls messaging. A parental controls application executing on the UE 126 or on a computer may send a parental control command to the telematics unit 104 via the communication hub 106 that commands the telematics unit 104 to monitor the velocity of the vehicle 102 and send a notification message to one or more designated UEs 126 identified in the parental control command if the vehicle exceeds a threshold velocity specified in the parental control command. For example, if a child has indicated they wish to borrow the car to visit friends in town and has promised to remain in town where the maximum in-town posted speed limit is 40 MPH, a parent may send a parental control command indicating a threshold velocity of 44 MPH. If the vehicle 102 exceeds 44 MPH, hence when the car is modestly exceeding the maximum in-town posted speed limit, the telematics unit 104 may send a notification message via the communication hub 106 to each of the father's UE 126 and the mother's UE 126. One of the parents may phone the child to ask why he or she is speeding and where they are currently driving. The parental controls command may further specify one or more locational criteria for sending a notification message via the communication hub 106 to the UE 126 when a location of the vehicle 102 fails to conform to the locational criteria (for example, to remain within a maximum distance from a specified location, leaving a predefined area, or the like).

The communication hub 106 may support stolen vehicle locator messaging. If an owner of the vehicle 102 reports the vehicle stolen, to police or via the UE 126, the communication hub 106 may send a message to the vehicle 102 querying the current location of the vehicle 102. The telematics unit 104 may reply to the query with the current location of the vehicle 102 determined by the telematics unit 104 based on self-location techniques such as global positioning system (GPS) coordinates developed by a GPS receiver in the telematics unit 104 or in the vehicle 102, by trilateration techniques, by providing an identity of a eNB 110 providing coverage to the telematics unit 104, or by another self-locating method. The stolen vehicle locator messaging framework may also support disabling the vehicle 102 when it is reported stolen. This may entail causing the engine to gradually slow down (gradually to avoid causing an accident).

Figure 2:
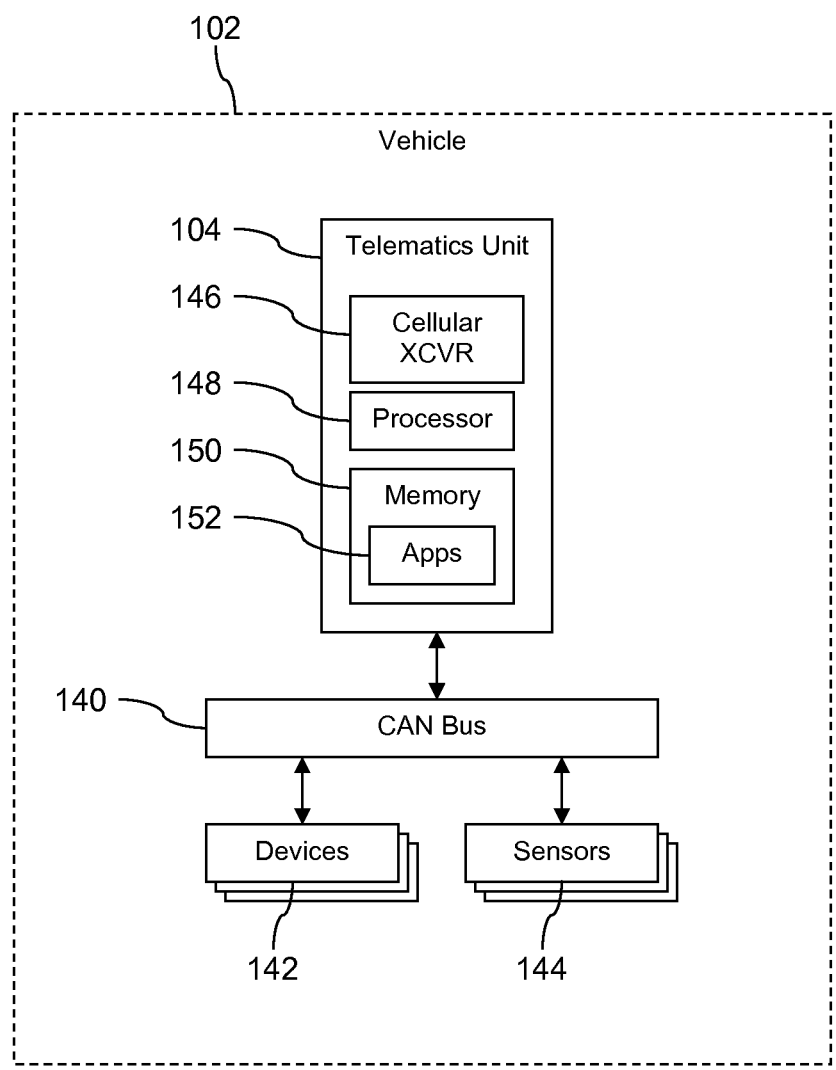
FIG. 2 is a block diagram of a vehicle comprising a telematics unit according to an embodiment of the disclosure.

Tuning now to FIG. 2, further details of the vehicle 102 and the telematics unit 104 are described. In an embodiment, the vehicle 102 comprises the telematics unit 104, a controller area network (CAN) bus 140, a plurality of devices 142, and a plurality of sensors 144. The vehicle 102 may be any of an automobile, a truck, or a boat. A CAN bus is a standard communications bus that allows processors and devices to communicate with each other. For example the CAN bus 140 promotes communication among the telematics unit 104, the devices 142, and the sensors 144. The devices 142 may be one or more of an engine control system, a vehicle interior environment control system (heating, air conditioning, defrosting, car seat heater, etc.), door lock electromechanical systems, window position electromechanical systems, and the like. The sensors 144 may be one or more of an outside temperature sensor, a vehicle interior temperature sensor, a precipitation sensor, engine temperature sensor, fuel level sensor, battery voltage sensor, and other sensors.

In an embodiment, the telematics unit 104 comprises a cellular radio transceiver 146, a processor 148, and a memory 150 comprising a messaging application 152. The cellular radio transceiver 146 may be configured to communicate with the eNB 110 according to one or more of a long-term evolution (LTE), a code division multiple access (CDMA), a global system for mobile communication (GSM), or a worldwide interoperability for microwave access (WiMAX) wireless communication protocol. The cellular radio transceiver 146 may be associated with a mobile telephone number such as a mobile subscriber identity (MSID) or an international mobile subscriber identity (IMSI) and with a unique electronic equipment identification number such as an international mobile equipment identity (IMEI), a mobile equipment identity (MEID), or an electronic serial number (ESN). This identifying information may be used to address or direct messages to the telematics unit 104, for example from the UE 126 or from a computer system to the telematics unit 104.

When a message is received by the telematics unit 104, the application 152 may process the message and take some action. Likewise, other applications (not shown) executing on the processor 148 may request the application 152 to send messages on their behalf to the UE 126 or to a computer system, for example to perform parental control notifications, to provide diagnostics information reporting in response to a query, etc. The application 152 may perform operations requested by messages received by the telematics unit 104 from the communication hub 106. Alternatively, the application 152 may delegate performance of operations requested by messages received by the telematics unit 104 to one or more other applications executing on the processor 148.

Turning back to FIG. 1, in an embodiment, the communication hub 106 comprises a plurality of components, functions, applications, and or systems. In an embodiment, the communication hub 106 comprises a messaging gateway 114, an event manager application 116, and an event data store 118. The event manager application 116, which may be referred to more concisely as the event manager 116 in some contexts herein, may execute on a first server computer 122a. The communication hub 106 may further comprise a state manager application 120 executing on a second server computer 122b. The state manager application 120 may be referred to more concisely as the state manager 120 in some contexts herein. The communication hub 106 may further comprise one or more additional applications 124 executing on one or more additional server computers 122c.

It is understood that in some embodiments, the event manager application 116 and the state manager application 120 may execute on the same server computer 122. In some embodiments, one or both of the event manager application 116 and the state manager application 120 may execute on the same server computer 122 with one or more of the additional applications 124. In an embodiment, the messaging gateway 114 may be implemented as an application and may execute on a server computer 122 with one or more of the event manager application 116, the state manager application 120, and/or the additional applications 124. In an embodiment, the communication hub 106 may be implemented using an enterprise service bus (ESB) architecture and may be referred to as an enterprise service bus communication platform in some contexts.

In an embodiment, the communication hub 106 is based on a publish-subscribe mechanism. Messages may be published to the communication hub 106 by the telematics unit 104, the UE 126, and by other computer systems. Messages may be subscribed to by the telematics unit 104, the UE 126, and by other computer systems. When a message is published, a subscriber is notified of the message and retrieves it. Alternatively, when a message is published, the message is copied and sent to the subscriber. The messaging gateway 114 may provide the management and storage of the messages according to the publish-subscribe mechanism. In an embodiment, the messaging gateway 114 uses a message queue telemetry transport (MQTT) publish-subscribe communication protocol.

The event manager application 116 may subscribe to monitor all messages that are published to the communication hub 106. The event manager application 116 may be considered to handle events, wherein events are substantially similar to the content messages and wake-up messages. In an embodiment, the event manager application 116 may provide other event centric functions not limited to message handling, for example interacting with other applications 124 executing on a server computer 122 in the communication hub 106 related to the processing and management of the communication hub 106, for example provisioning new telematics units 104 to be served by the communication hub 106 and other non-message processing functionality.

Each telematics unit 104 may be associated with a communication state that is stored in the event data store 118. In an embodiment, the communication state of the telematics unit 104 may be either on-line or off-line. In an alternative embodiment, the communication state may be on-line, off-line, or off-line exception. When the telematics unit 104 has a data communication session established with the communication hub 106 via the eNB 110, the communication state of the telematics unit 104 is on-line. While the telematics unit 104 has a data communication session established, it may periodically transmit a message to the communication hub 106 and/or the messaging gateway 114 indicating the continued viability of this data communication session. This may be referred to as a heartbeat message in some contexts. The state manager application 120 may control and update the communication state of telematics units 104 and store that in the event data store 118.

If the telematics unit 104 is preparing to terminate the data communication session, for example when the vehicle 102 has been turned off and the occupants of the vehicle have left the vehicle (e.g., seat sensors indicate no weight on seats and/or door locks lock), a message may be sent to the communication hub 106 indicating an off-line communication state of the telematics unit 104. This may be referred to in some contexts as a graceful state transition or a graceful off-line state. In some cases the telematics unit 104 may have no opportunity to inform the communication hub 106 that the data communication session is terminating, for example when the vehicle 102 drives out of wireless service coverage. In this case, the state manager application 120, which may be subscribed to receive heartbeat messages sent by telematics units 104, may detect that the heartbeat messages from the telematics unit 104 in the vehicle 102 that has driven out of coverage are no longer being received and may declare the communication state of the telematics unit 104 to be off-line exception. This may be referred to in some contexts as a graceless state transition or a graceless off-line state transition.

When a message addressed to the telematics unit 104 is received by the communication hub 106 and/or the messaging gateway 114, the event manager application 116 will see this message (because it is subscribed to all messages). The event manager application 116, responsive to the new message, checks the communication state of the subject telematics unit 104. If the communication state of the telematics unit 104 is on-line, the event manager application 116 takes no action, and the message propagates out to the telematics unit 104 in the normal publish-subscribe message flow. This may be referred to as a passive mode of operation of the event manager application 116. On the other hand, if the communication state of the telematics unit 104 is off-line the event manager application 116 may handle the message in an active mode of operation.

In an embodiment, when a message (i.e., a content message) is received by the communication hub 106 that is directed to the telematics unit 104 when it is associated with an off-line state, the event manager application 116 sends a wake-up message to the telematics unit 104. In an embodiment, the wake-up message may be sent as a short message service (SMS) message via a voice channel of a wireless communication link to the telematics unit 104. In an embodiment, the telematics unit 104 may be able to receive wake-up messages even when the communication state of the telematics unit 104 is off-line, for example by monitoring a paging channel of the eNB 110. In response to the wake-up message, the telematics unit 104 establishes a wireless data communication link with the eNB 110 and establishes a data communication session with the communication hub 106 and/or the messaging gateway 114. The message (i.e., the content message) may then flow from the communication hub 106 and/or the messaging gateway 114 to the telematics unit 104 according to normal publish-subscribe mechanisms, or the event manager application 116 may itself transmit the subject message to the telematics unit 104. This may be referred to as an active mode of operation of the event manager application 116.

It will be appreciated that the processing of the event manager application 116 in the active mode of operation is more burdensome and processor intensive, entailing additional messaging cycles with telematics unit 104 and/or other applications 124 executing on servers 122 of the communication hub 106. Because the communication hub 106 may support communications with a very large number of telematics units 104, the avoidance of the increased processing inherent in the active mode of operation of the event manager application 116 can promote efficiency of the handling of messaging by the communication hub 106. The use of the passive mode of operation of the event manager application 116 when the telematics unit 104 is in an on-line communication state supports this increased efficiency and contributes to the scalability of the communication hub 106.

In an embodiment, messages may have different priorities. For example, ROC messages may be deemed high priority messages while diagnostic data messages or diagnostic data feed messages may be deemed low priority messages. Parental control messages and vehicle locate messages may also be deemed high priority messages. When a low priority message is received, and the event manager application 116 determines that the telematics unit 104 is in an off-line communication state, the event manager application 116 may not perform an active mode communication (hence does not send the wake-up message to the telematics unit 104) but may instead merely enqueue the subject low priority message for publication and/or transmission to the telematics unit 104 when it reestablishes a data communication session with the communication hub 106 and/or the messaging gateway 114 in the due course of time, for example when the engine of the vehicle 102 is next turned on. On the other hand, when a high priority message is received, the event manager application 116 may perform an active mode operation as described above.

In an embodiment, messages may have one of a high priority, a medium priority, or a low priority. If the communication state of the telematics unit 104 is off-line, the event manager application 116 does not process a low priority message to the telematics unit 104 in the active mode but does process a medium priority message or a high priority message in the active mode. If the communication state of the telematics unit 104 is off-line exception (meaning the vehicle 102 and the telematics unit 104 may be outside of coverage of the wireless communication service provided by the wireless communication service provider with which the telematics unit 104 is subscribed to receive wireless communication service), the event manager application 116 does not process a low priority or a medium priority message in the active mode but does process a high priority message in the active mode. In this case, the high priority messages may be deemed important enough to burden the subscriber with data wireless roaming charges in order to promote transmitting the message to the telematics unit 104 timely.

Figure 3:
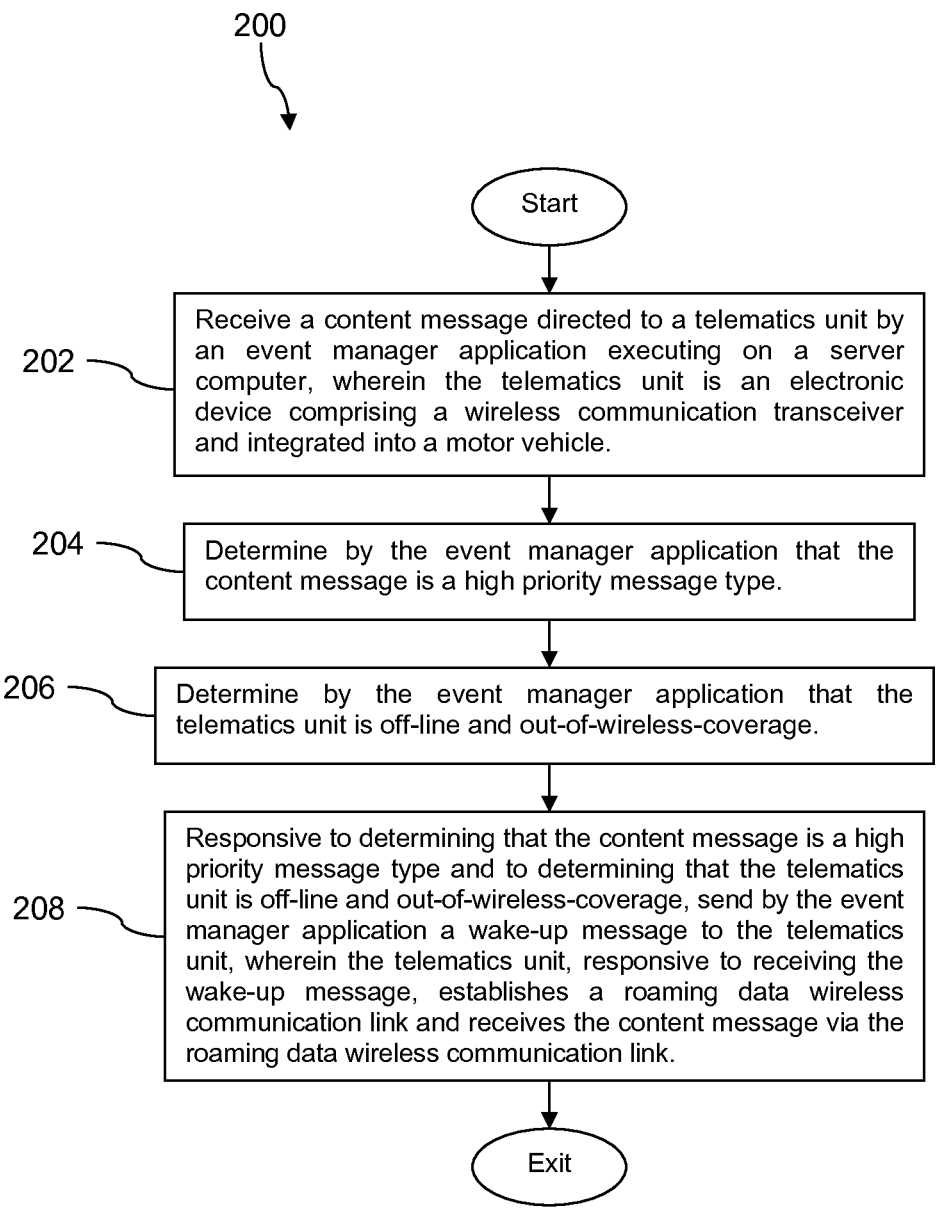
FIG. 3 is a flow chart of a method according to an embodiment of the disclosure.

Turning now to FIG. 3, a method 200 is described. In an embodiment, the method 200 entails communicating with telematics units in vehicles by a communication hub in a wireless communication service provider network that maintains communication state information about a plurality of telematics units, wherein the telematics unit communication states comprise an on-line state, an off-line state, and an off-line and out-of-wireless coverage state. At block 202, receive a content message directed to a telematics unit by an event manager application executing on a server computer, wherein the telematics unit is an electronic device comprising a wireless communication transceiver and integrated into a motor vehicle. A telematics unit 104 is described in further detail above with reference to FIG. 1 and FIG. 2. At block 204, determine by the event manager application that the content message is a high priority message type. At block 206, determine by the event manager application that the telematics unit is off-line and out-of-wireless-coverage (e.g., that the communication state of the telematics unit is off-line exception or graceless off-line). At block 208, responsive to determining that the content message is a high priority message type and to determining that the telematics unit is off-line and out-of-wireless-coverage, send by the event manager application a wake-up message to the telematics unit, wherein the telematics unit, responsive to receiving the wake-up message, establishes a roaming data wireless communication link and receives the content message via the roaming data wireless communication link.

Figure 4:
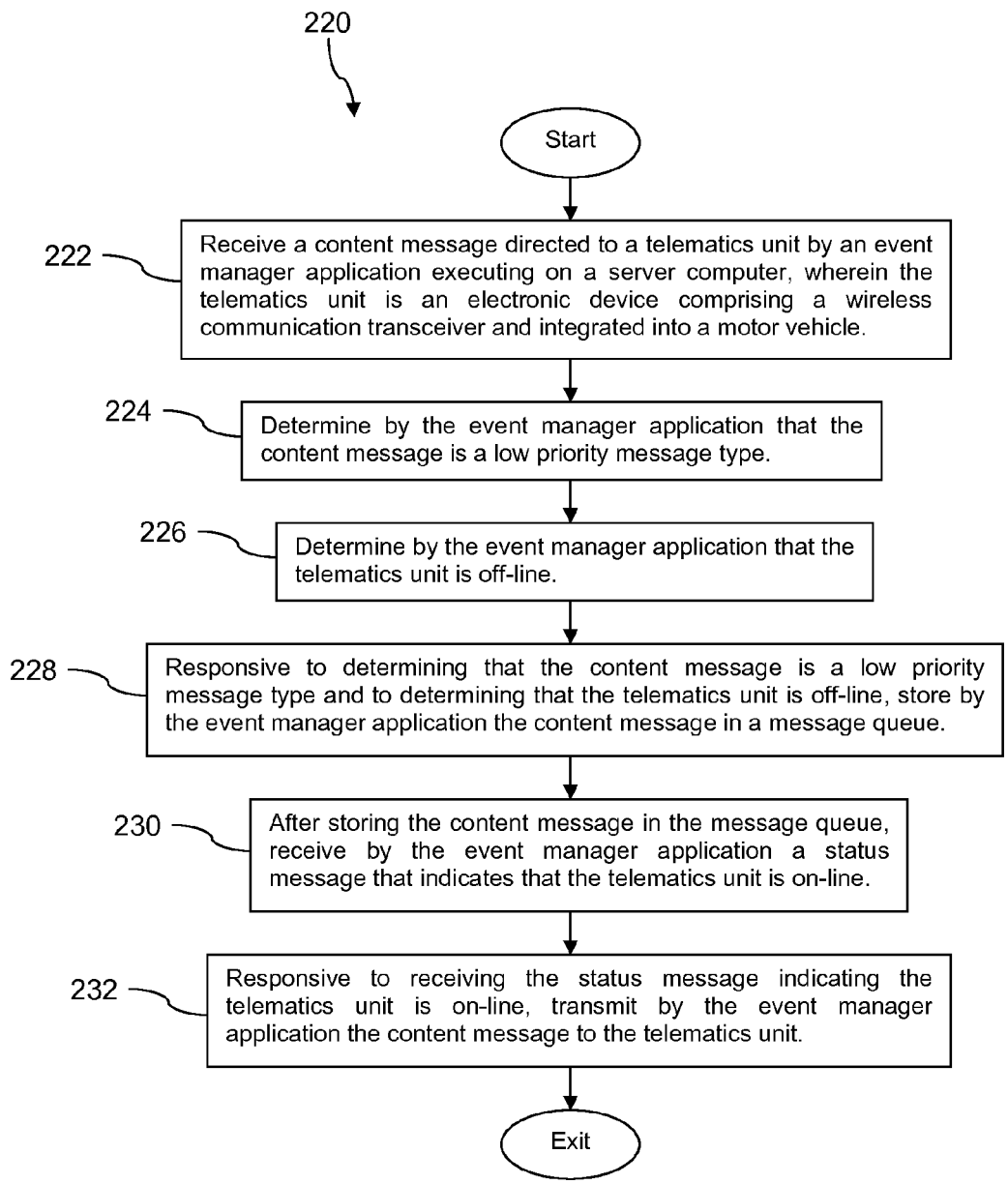
FIG. 4 is a flow chart of another method according to an embodiment of the disclosure.

Turning now to FIG. 4, a method 220 is described. At block 222, receive a content message directed to a telematics unit by an event manager application executing on a server computer, wherein the telematics unit is an electronic device comprising a wireless communication transceiver and integrated into a motor vehicle. A telematics unit 104 is described in further detail above with reference to FIG. 1 and FIG. 2. At block 224, determine by the event manager application that the content message is a low priority message type. At block 226, determine by the event manager application that the telematics unit is off-line. At block 228, responsive to determining that the content message is a low priority message type and to determining that the telematics unit is off-line, store by the event manager application the content message in a message queue. At block 230, after storing the content message in the message queue, receive by the event manager application a status message that indicates that the telematics unit is on-line. At block 232, responsive to receiving the status message indicating the telematics unit is on-line, transmit by the event manager application the content message to the telematics unit. In an embodiment, responsive to receiving the status message indicating the telematics unit is on-line, the event manager application may further transmit a plurality of content messages to the telematics unit that are stored on the message queue.

Figure 5:
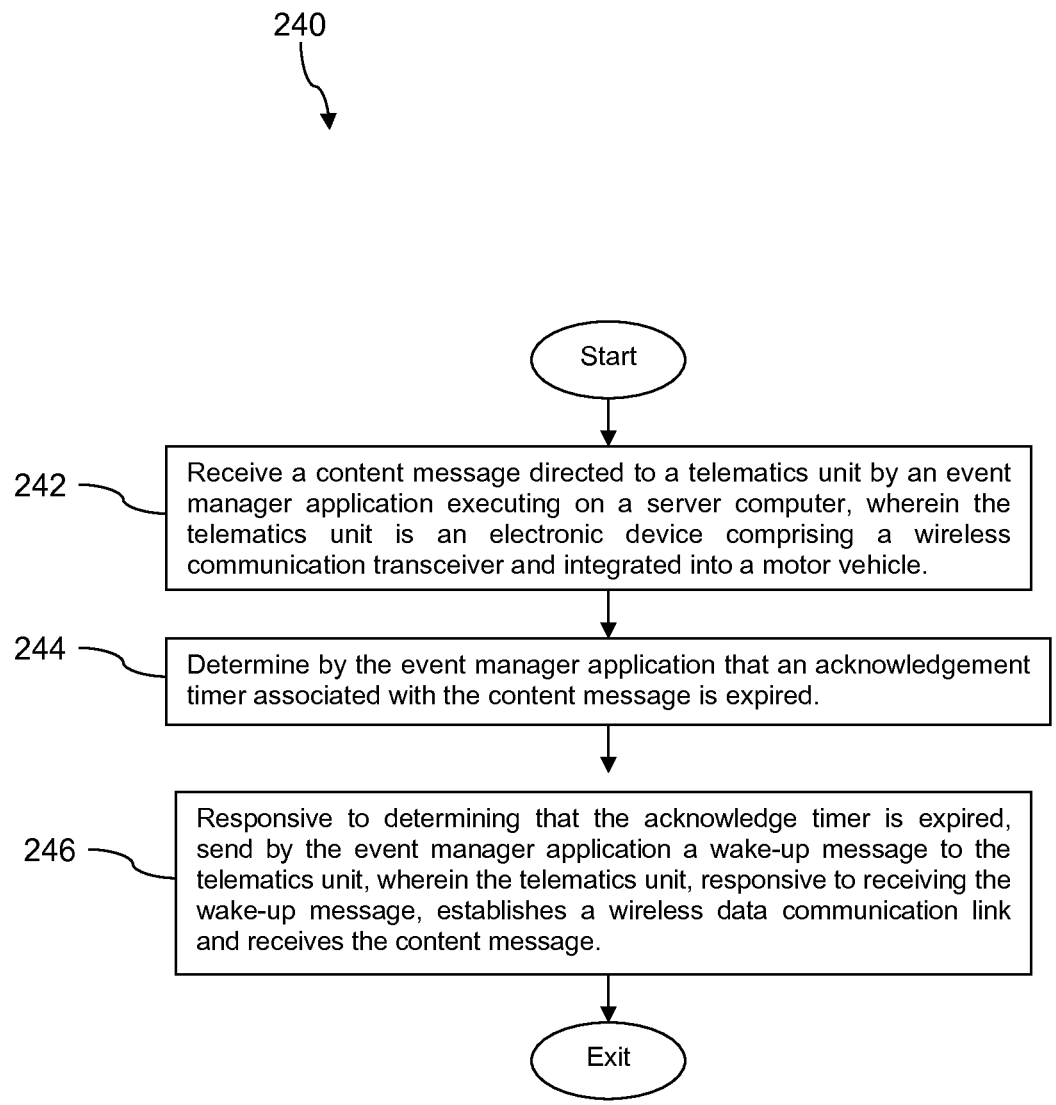
FIG. 5 is a flow chart of yet another method according to an embodiment of the disclosure.

Turning now to FIG. 5, a method 240 is described. At block 242, receive a content message directed to a telematics unit by an event manager application executing on a server computer, wherein the telematics unit is an electronic device comprising a wireless communication transceiver and integrated into a motor vehicle. The event manager application may subscribe to receive copies of content messages sent to all telematics unit. A telematics unit 104 is described in further detail above with reference to FIG. 1 and FIG. 2. In an embodiment, responsive to receiving the content message directed to the telematics unit, the event manager application initiates a count-down timer having a predetermined expiration duration. The predetermined expiration duration may be about 1 second, about 10 seconds, about 1 minute, or about 5 minutes. In an embodiment, a different predetermined expiration duration may be employed. The event manager application may decrement the count-down timer as time passes. If the subject telematics unit is determined to have an off-line communication state, the event manager may not set the count-down timer. At block 244, determine by the event manager application that an acknowledgement timer associated with the content message is expired. At block 246, responsive to determining that the acknowledge timer is expired, send by the event manager application a wake-up message to the telematics unit, wherein the telematics unit, responsive to receiving the wake-up message, establishes a wireless data communication link and receives the content message.

Figure 6:
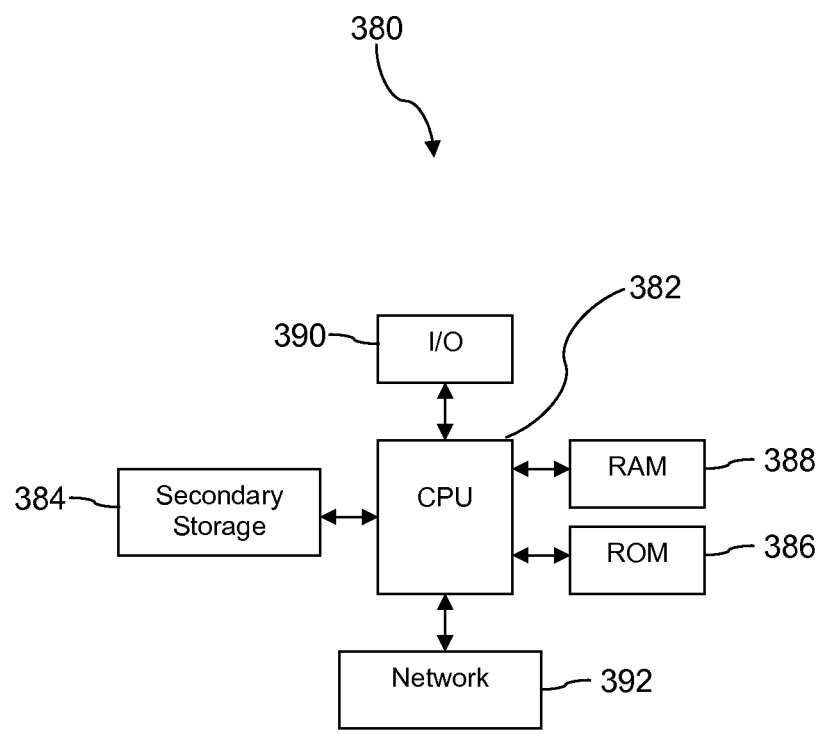
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of communicating with telematics units in vehicles by a communication hub in a wireless communication service provider network that maintains communication state information about a plurality of telematics units, wherein the telematics unit communication states comprise an on-line state, an off-line state, and an off-line and out-of-wireless coverage state, comprising:
    receiving a content message directed to a telematics unit by an event manager application executing on a server computer, wherein the telematics unit is an electronic device comprising a wireless communication transceiver and integrated into a motor vehicle;
    determining by the event manager application that the content message is a high priority message type;
    determining by the event manager application that the telematics unit is off-line and out-of-wireless-coverage; and
    responsive to determining that the content message is a high priority message type and to determining that the telematics unit is off-line and out-of-wireless-coverage, sending by the event manager application a wake-up message to the telematics unit,
    wherein the telematics unit, responsive to receiving the wake-up message, establishes a roaming data wireless communication link and receives the content message via the roaming data wireless communication link.

2. The method of claim 1, wherein the high priority message type is one of a remote operation message type, a parental controls message type, or a vehicle locate message type.

3. The method of claim 1, wherein the event manager application sends the wake-up message as a short message service (SMS) message.

4. The method of claim 1, wherein the telematics unit is configured to establish a wireless communication link according to one of a long-term evolution (LTE), a code division multiple access (CDMA), a global system for mobile communications (GSM), or a worldwide interoperability for microwave access (WiMAX) wireless communication protocol.

5. The method of claim 1, wherein the event manager application is subscribed to receive messages sent to the telematics unit via a messaging gateway and messages received from the telematics unit via the messaging gateway, wherein the messaging gateway executes on a server computer in a wireless communication service provider network.

6. The method of claim 1, further comprising:
    receiving a second content message directed to a second telematics unit by the event manager application, wherein the second telematics unit is an electronic device comprising a second wireless communication transceiver and integrated into a second motor vehicle;

determining by the event manager application that the second telematics unit is on-line; and responsive to determining that the second telematics unit is on-line, not sending by the event manager application a wake-up message to the second telematics unit, wherein the second telematics unit retrieves the second content message from a messaging gateway without intervention of the event manager application.

7. The method of claim 6, wherein the event manager application and the messaging gateway are part of an enterprise service bus communication platform that promotes wireless message communication to and from a plurality of telematics units.

8. The method of claim 1, further comprising:

receiving a second content message directed to the telematics unit by the event manager application;

determining by the event manager application that the second content message is a low priority message type;

determining by the event manager application that the telematics unit is off-line;

responsive to determining that the second content message is a low priority message type and to determining that the telematics unit is off-line, storing by the event manager application the second content message in a message queue;

after storing the second content message in the message queue, receiving by the event manager application a status message that indicates that the telematics unit is on-line; and responsive to receiving the status message indicating the telematics unit is on-line, transmitting by the event manager application the second content message to the telematics unit.

9. The method of claim 8, further comprising the event manager application transmitting a plurality of content messages to the telematics unit that are stored on the message queue in response to receiving the status message indicating that the telematics unit is on-line.

10. The method of claim 8, wherein the event manager application sends the second content message to the telematics unit by sending the second content message to a messaging gateway.

11. The method of claim 10, wherein the messaging gateway uses message queue telemetry transport (MQTT) publish-subscribe communication protocol.

12. The method of claim 11, wherein the event manager application subscribes to receive all messages sent to and received from telematics units via the messaging gateway.

13. The method of claim 8, wherein a state of the telematics unit is stored in a data store in an enterprise service bus communication platform and the event manager application determines the on-line or off-line state of the telematics unit by accessing the data store.

14. The method of claim 8, wherein the motor vehicle is one of an automobile, a truck, or a boat.

15. The method of claim 1, further comprising:

receiving a second content message directed to the telematics unit by the event manager application;

determining by the event manager application that an acknowledgement timer associated with the second content message is expired; and responsive to determining that the acknowledgement timer is expired, sending by the event manager application a wake-up message to the telematics unit, wherein the telematics unit, responsive to receiving the wake-up message, establishes a wireless data communication link and receives the second content message.

16. The method of claim 15, wherein the wireless data communication link is based on one of a long-term evolution (LTE), a code division multiple access (CDMA), a global system for mobile communication (GSM), or a worldwide interoperability for microwave access (WiMAX) wireless communication protocol.

17. The method of claim 15, further comprising, responsive to receiving the second content message, initiating by the event manager application a count-down timer associated with the second content message having a predetermined expiration.

18. The method of claim 17, further comprising, responsive to receiving the second content message, determining a state of the telematics unit to be on-line, wherein initiating the count-down timer is further performed responsive to the determination of the on-line state of the telematics unit.

19. The method of claim 18, further comprising:

receiving a different content message directed to a different telematics unit by the event manager application, wherein the different telematics unit is an electronic device comprising a wireless communication transceiver and integrated into a different motor vehicle;

determining that the state of the different telematics unit is off-line; and responsive to the determination that the state of the different telematics unit is off-line, storing the different content message in a message queue and not initiating a count-down timer associated with the different content message.

20. The method of claim 19, further comprising:

after storing the different content message in the message queue, receiving by the event manager application a status message that indicates that the different telematics unit is on-line; and responsive to receiving the status message indicating the different telematics unit is on-line, retrieving the different content message from the message queue by the event manager application and transmitting by the event manager application the different content message to the different telematics unit.

* * * * *